(12) United States Patent
Blom et al.

(10) Patent No.: US 8,750,506 B2
(45) Date of Patent: Jun. 10, 2014

(54) METHODS, NODES, SYSTEM, COMPUTER PROGRAMS AND COMPUTER PROGRAM PRODUCTS FOR SECURE USER SUBSCRIPTION OR REGISTRATION

(75) Inventors: Rolf Blom, Jarfalla (SE); David Castellanos Zamora, Madrid (ES)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 242 days.

(21) Appl. No.: 13/056,393

(22) PCT Filed: Dec. 22, 2008

(86) PCT No.: PCT/EP2008/068190
§ 371 (c)(1),
(2), (4) Date: Jan. 28, 2011

(87) PCT Pub. No.: WO2010/012318
PCT Pub. Date: Feb. 4, 2010

(65) Prior Publication Data
US 2011/0126017 A1    May 26, 2011

Related U.S. Application Data

(60) Provisional application No. 61/085,099, filed on Jul. 31, 2008.

(51) Int. Cl.
*H04L 9/00* (2006.01)
(52) U.S. Cl.
USPC .............. 380/247; 380/249; 713/2; 455/410
(58) Field of Classification Search
USPC ........................................ 455/410
See application file for complete search history.

(56) References Cited

U.S. PATENT DOCUMENTS

| | | | | |
|---|---|---|---|---|
| 6,363,411 | B1* | 3/2002 | Dugan et al. | 709/202 |
| 6,990,353 | B2* | 1/2006 | Florkey et al. | 455/519 |
| 2003/0229783 | A1* | 12/2003 | Hardt | 713/155 |
| 2004/0148527 | A1* | 7/2004 | Wary | 713/202 |
| 2004/0203873 | A1* | 10/2004 | Gray | 455/456.1 |
| 2006/0002557 | A1* | 1/2006 | Madour | 380/270 |
| 2008/0016230 | A1* | 1/2008 | Holtmanns et al. | 709/229 |
| 2009/0282236 | A1* | 11/2009 | Hallenstal et al. | 713/151 |
| 2009/0313466 | A1* | 12/2009 | Naslund et al. | 713/155 |
| 2010/0005156 | A1* | 1/2010 | Wesby | 709/219 |
| 2010/0188975 | A1* | 7/2010 | Raleigh | 370/230.1 |
| 2010/0192120 | A1* | 7/2010 | Raleigh | 717/101 |

FOREIGN PATENT DOCUMENTS

| | | | |
|---|---|---|---|
| CN | 101141792 | * | 3/2008 |
| SE | WO2007/008120 | * | 1/2007 |

OTHER PUBLICATIONS

Niemi, "3GPP Security", Future Security Workshop, Jan. 2007.*

(Continued)

*Primary Examiner* — Peter Poltorak
(74) *Attorney, Agent, or Firm* — Coats & Bennett, PLLC

(57) ABSTRACT

Methods and apparatus facilitate secure user subscription or registration to a service at least partly enabled in a network. The network comprises user equipment adapted to perform generic bootstrapping. A network application function provides the service. A bootstrapping server function generates a bootstrapping transaction identifier. A home subscriber system stores a user profile, comprising information relating to the user and at least one service provided by the network application function.

10 Claims, 6 Drawing Sheets

(56) References Cited

OTHER PUBLICATIONS

PKT-SP-33.220-103-070925: Generic Authentication Architecture (GAA) Generic bootstrapping architecture Specification, 3GPP TS 33.220, Sep. 2007.*

3rd Generation Partnership Project. S3-080605. 3GPP TS 33.223, V8.0.0 (Jun. 2008). 3rd Generation Partnership Project; Technical Specification Group Services and System Aspects; Generic Authentication Architecture (GAA); Generic Bootstrapping Architecture (GBA) Push Function (Release 8). Jun. 2008.

3rd Generation Partnership Project. 3GPP TS 33.220, V8.0.0 (Jun. 2007). 3rd Generation Partnership Project; Technical Specification Group Services and System Aspects; Generic Authentication Architecture (GAA); Generic bootstrapping architecture (Release 8). Jun. 2007.

* cited by examiner

US 8,750,506 B2

METHODS, NODES, SYSTEM, COMPUTER PROGRAMS AND COMPUTER PROGRAM PRODUCTS FOR SECURE USER SUBSCRIPTION OR REGISTRATION

TECHNICAL FIELD

The invention relates to methods, network nodes, a system, computer program products and computer programs for providing Generic Bootstrapping Architecture (GBA) enhancement to support a service.

BACKGROUND

The 3GPP ($3^{rd}$ Generation Partnership Project) authentication infrastructure, including AuC (3GPP Authentication Centre), USIM (Universal Subscriber Identity Module) or ISIM (IMS Subscriber Identity Module), and 3GPP AKA (Authentication and Key Agreement) protocol run between them, is a very valuable asset of 3GPP operators. It has been recognised that this infrastructure could be leveraged to enable application functions in the network and on the user side to establish shared keys. Therefore, 3GPP defined GBA, which is able to distribute shared secrets to a UE (User Equipment) and an authentication proxy which takes the role of a NAF (Network Application Function) using AKA-based mechanisms.

In accordance with 3GPP TS 33.220 "3rd Generation Partnership Project; Technical Specification Group Services and System Aspects; Generic Authentication Architecture (GAA); Generic Bootstrapping Architecture" Version 8.0.0, FIG. 1 of this application shows a simple reference model for bootstrapping keys in a NAF and UE with support from a network infrastructure component, a BSF (Bootstrapping Server Function) and an HSS (Home Subscriber System).

With reference to FIG. 2, a typical flow with current GAA (Generic Authentication Architecture)/GBA specifications could be as follows:

1. A user tries to access an application via the Ua interface between the UE and the NAF.
  a) The UE could have included already bootstrapping information as generated following steps 2 to 4 below. Then the flow will continue in step 5 below.
  b) Otherwise, if the NAF requires the use of shared keys obtained by means of the GBA, but the request from the UE does not include GBA-related parameters, the NAF replies with a bootstrapping initiation message.
2. The UE, as redirected by the NAF or as configured prior communication with a NAF over Ua interface, contacts the BSF over Ub interface between the UE and the BSF.
3. The BSF then contacts the HSS over interface/reference point Zh between the BSF and the HSS in order to be able to execute AKA authentication towards the UE over the Ub interface. The purpose of this user authentication is solely to generate shared secrets. The BSF generates a B-TID (Bootstrapping Transaction Identifier) that will identify the credential material generated.
4. This B-TID is propagated to the NAF via Ub and Ua interfaces/reference points through the UE.
5. The NAF contacts the BSF over interface/reference point Zn using the B-TID received from the UE.
6. The BSF replies back with the credential material for NAF consumption.

At this point, the NAF is able to use the distributed credentials. In case this material should be used for further end-user authentication the NAF would initiate e.g. http-digest procedure using the distributed shared secrets as defined in 3GPP TS 33.222 "3rd Generation Partnership Project; Technical Specification Group Services and System Aspects; Generic Authentication Architecture (GAA); Access to Network Application Function using HTTPS" Version 7.3.0. The credential can also be used for other purposes than authentication, e.g. integrity, confidentiality, key derivation.

The overall procedure is shown in more detail in FIG. 2 of this application. In Step 201, the UE sends an http request via the Ua interface to the NAF. The NAF returns an http response comprising a bootstrapping request in step 202. The UE then sends in step 203 an http request for bootstrapping service based on the user identity to the BSF. In step 204, the BSF performs a get user security settings (GUSS) with the HSS.

An http digest Authentication and Key Agreement is executed between the BSF and the UE. In step 205 the BSF may return a "401 unauthorized" message, indicating that no authorization is available for the digest, comprising RAND (Random Challenge in Authentication) and AUTN (Authentication token). Based on RAND and AUTN, the mobile equipment executes an Authentication and Key Agreement with a UICC application in the UE, which returns a response RES (Response in Authentication) to the UE.

In step 206 the UE sends an http request comprising the response RES to the BSF. The BSF generates, in step 207, a B-TID (Bootstrapping Transaction Identifier) that will identify the credential material generated. In both the UE and the BSF, keys Ks are obtained from concatenated Ck and Ik, and a key Ks_NAF for the NAF is generated (steps 208a and 208b).

TLS (Transport Layer Security) encryption begins in step 209 with a TLS handshake between the UE and the NAF. The UE then sends an application protocol https request to the NAF in step 210, indicating that 3GPP GBA is supported, and comprising the B-TID.

The NAF contacts the BSF over interface/reference point Zn using the B-TID received from the UE and the NAF name in an authentication request in step 211. The BSF replies back in step 212 with an authentication answer comprising the credential material for NAF consumption: Ks_NAF, Prof, Bootstrap time, key lifetime).

At this point, the NAF is able to use the distributed credentials. In case this material should be used for further end-user authentication the NAF may initiate e.g. http-digest procedure using the distributed shared secrets (steps 213 to 215) as defined in 3GPP TS 33.222 "3rd Generation Partnership Project; Technical Specification Group Services and System Aspects; Generic Authentication Architecture (GAA); Access to Network Application Function using HTTPS" Version 7.3.0. The credential can also be used for other purposes than authentication, e.g. integrity, confidentiality, key derivation.

Additionally, 3GPP is defining for 3GPP Release 8 an architecture and related mechanisms for GBA Push Services applicable to scenarios where the UE is not forced to contact a BSF to initiate bootstrapping. FIG. 3 shows the reference model for GBA Push according to 3GPP TS 33.223 "3rd Generation Partnership Project; Technical Specification Group Services and System Aspects; Generic Authentication Architecture (GAA); Generic Bootstrapping Architecture (GBA) Push Function" version 8.0.0. A UE is linked with a NAF via two interfaces, Upa and Ua. The NAF is connected to a BSF via a Zpn interface. The BSF can communicate with an HSS via interface Zh, and with an SLF (Subscriber Locator Function) via interface Dz.

A typical flow with GBA-Push could be as shown in FIG. 4. The NAF generates a request for the generation of key material (Ks_NAF as in GBA) and related info, GPI (GBA- Push-Info) (step 401) and sends the request to the BSF (step 402). The BSF initially processes the GPI request in step 403 and send an AV request based on the IMPI to the HSS in step 404. The HSS returns in step 405 an AV response comprising the AV and USS to the BSF. The BSF uses this information in step 406 for the generation of the NAF SA, and sends a GPI response to the NAF comprising the requested GBA-Push-Info.

NAF then pushes the GPI (which includes RAND and AUTN) to UE over a Push channel/interface, Upa, which may be e.g. SMS (Short Message Service) and MMS (Multimedia Messaging Service) (steps 408 and 409 of FIG. 4). Finally (step 410 of FIG. 4), the UE runs AKA and generates Ks_NAF (as in GBA). This results in the establishment of a shared SA (Security Association) between the NAF and the UE (Ks_NAF). When the GBA Push procedure is completed and the key material received over the Upa interface (e.g. SMS) is processed, the UE is ready to receive protected Push messages from the NAF over Ua reference point (e.g. http). After the SA establishment, the NAF can send protected Push-messages to the UE, as shown is step 411. If a return channel exists, and if provided by the application utilizing reference point Ua, the UE can also use the established SA to send protected response messages to the NAF.

3GPP TS 33.224 "3rd Generation Partnership Project; Technical Specification Group Services and System Aspects; Generic Authentication Architecture (GAA); Generic Bootstrapping Architecture (GBA) Push Layer" Version 0.1.0. defines the typical Use Cases for GBA Push Services including NAF initiated Key Refresh, Distribution of Keys, Tokens, Vouchers and Tickets. GBA Push is also envisioned for Device Management procedures, DRM (Digital Rights Management), SUPL (Secure User Plane Location), Broadcasting and even as a means for load balancing GBA procedures.

GBA Push as currently defined in 3GPP TS 33.223 requires that the NAF is aware of certain information before the related GBA Push mechanisms can be triggered. The information comprises:

UEid (IMPI (IP Multimedia Private Identity), IMSI (International Mobile Station Identity), IMPU (IP Multimedia Public Identity), MSISDN (Mobile Station Integrated Services Digital Network) to use in GBA Push request to BSF;

UE Transport Id used for GBA Push service delivery method to the UE, e.g. MSISDN to send SMS;

BSF address;

and, optionally, a UICC (Universal Integrated Circuit Card) Application to use for GBA Push service.

The 3GPP TS 33.223 does not define how the NAF gathers this information, which causes a number of issues, limitations and uncertainties. For some Push services it is assumed that the NAF and the UE have a previous relation where e.g. a user is subscribed to a NAF service. The user may provide some of the required information at subscription/registration time. For example, a user subscribing to e.g. a NAF broadcasting service, will be able to provide its MSISDN as UE Transport ID to get an SMS or MMS as Push delivery method. Furthermore the User may be able to additionally indicate its mobile and/or IMS operator provider.

Making users type personal information during subscription/registration processes is usually not very well perceived and always implies a risk to lose the customer. Furthermore, in this case, a user will not be able to provide much more information than the one indicated above during the subscription/registration process.

It is not likely that the user will know about its IMPI/IMSI, i.e. private identities, used by the system. This means that only public identities would be available as UEid for GBA Push requests to BSF. For reasons of privacy, NAFs may be restricted from accessing private identities, anyway.

With public identities it will not be possible for the NAF to discover the BSF. Especially with MSISDN where no domain name is available and mapping to IMSI is not possible. The user provided mobile/IMS operator provider may be of assistance in order to identify the right domain to address the query, but that will not provide all the required information to the NAF to discover the BSF, especially if multiple BSF instances are deployed within the mobile/IMS operator domain.

It is not likely either that the User will be aware of which UICC application to use.

Furthermore, GBA Push procedures may fail even if the NAF manages to obtain the right set of information, as it may not be authorized by the BSF for the execution of GBA-Push services for that user. It could also be the case that a particular user is not enabled for GBA-Push in the first place.

SUMMARY

An object of the invention is to overcome at least one of the above disadvantages and to enhance NAF services.

According to a first aspect of the invention a method relates to secure user subscription or registration to a service at least partly enabled in a network. The network comprises a user equipment adapted to perform generic bootstrapping. At least one network application function is foreseen for providing the service. A bootstrapping server function is provided for storing a user profile, comprising information relating to the user and at least one service provided by the at least one network application function. The bootstrapping server function stores a user profile and a bootstrapping transaction identifier. Upon receipt of a secure application request comprising the bootstrapping transaction identifier from the user equipment, the network application function transmits a bootstrapping information request comprising the bootstrapping transaction identifier to the bootstrapping server function node. In response to the bootstrapping information request received from the network application function, the bootstrapping server function generates a network application key for the network application function, and provides the network application key and service related information from the stored user profile to the network application function. The network application function stores the network application key and the service related information. The network application function completes the secure user subscription to the service based on the service related information and the network application key.

The network may further comprise a home subscriber system which stores the user profile. Upon receipt of a bootstrapping service request comprising a user identity from the user equipment, the bootstrapping server function may send an authentication request based on the user identity to the home subscriber system node. In response to the authentication request received from the bootstrapping server function node, the home subscriber system may retrieve the stored user profile based on the user identity and transmit an authentication answer comprising the stored user profile to the bootstrapping server function. Upon receipt of the authentication answer comprising the user profile from the home subscriber system, the bootstrapping server function may generate a bootstrapping transaction identifier and communicate the bootstrapping transaction identifier to the user equipment. The bootstrapping server function may store the received user profile and the bootstrapping transaction identifier.

In response to a user subscription or registration request received from the user equipment, the network application function may determine that the requested service requires a secure session, and may initiate the user subscription or registration by transmitting a bootstrapping request to the user equipment.

The bootstrapping information request sent from the network application function to the bootstrapping server function may include an indicator for push services.

In response to the bootstrapping information request received from the network application function, the bootstrapping server function may further determine from the user profile if the user is authorised for the requested service and if so, transmit a service authorization to the network application function.

The stored user profile may further comprise a privacy indicator. Upon receipt of the authentication answer comprising a user profile with privacy indicator, the bootstrapping server function may further generate a privacy protected identifier for the user equipment when communicating the bootstrapping transaction identifier to the user equipment. The privacy protected identifier may then take the place of the user equipment identifier in the subsequent steps when communicating with the network application function.

The network application function may include the received privacy protected identifier instead of the user identifier when communicating with the bootstrapping server function in future interactions.

The bootstrapping server function may determine the user identifier, if a privacy protected identifier has been received instead of a user identifier in a request from the network application function.

The stored user profile may be comprised in stored user-related security settings.

The network application function may further apply a user's stored service related information for the initiation of a subsequent bootstrapping push service request for the same user towards the bootstrapping server function.

The stored user profile may comprise at least one of the following:
 a user identifier;
 a user transport identifier; or
 a bootstrapping server function address for the requested service.

The stored user profile may further comprise an application identifier.

According to a second aspect of the invention a communication network node comprises a network application function for securing a user subscription or registration process in a network. The communication network node comprises first communication means for communicating with a user equipment. Second communication means are provided for communicating with a bootstrapping server function node. Means are foreseen for transmitting a bootstrapping information request comprising a bootstrapping transaction identifier to the bootstrapping server function node upon receipt of a secure application request comprising the bootstrapping transaction identifier from the user equipment. First storage means are provided for receiving and storing a network application key and service related information from a user profile from the bootstrapping server function node.

Moreover, means are foreseen for completing the secure user subscription to the service based on the service related information and the network application key.

The communication network node may further comprise means for initiating the secure user subscription or registration and transmitting a bootstrapping request to the user equipment in response to a secure user subscription or registration request received from the user equipment.

The communication network node may further comprise means for including an indicator for push services when sending a bootstrapping information request to the bootstrapping server function node.

The communication network node may further comprise means for receiving a push service authorization from the bootstrapping server function node in response to the bootstrapping information request.

The communication network node may further comprise means for using a privacy protected identifier received from the user equipment instead of the user identifier, when communicating with the bootstrapping server function node.

The communication network node may further comprise means for using a user's stored service related information for initiating a subsequent bootstrapping service request for the same user to the bootstrapping server function node;

A third aspect of the invention relates to a method of operating a network application function node for secure user subscription or registration to a service at least partly enabled in a network. Upon receipt of a secure application request and a bootstrapping transaction identifier from a user equipment, the network application function node transmits a bootstrapping information request comprising the bootstrapping transaction identifier to a bootstrapping server function node. The network application function node receives a network application key and the service related information from a user profile from the bootstrapping server function node. The network application function node stores the received network application key and the service-related information. The network application function node completes the secure user subscription to the service based on the service related information and the network application key.

In response to a user subscription or registration request received from the user equipment, the network application function node may determine that the requested service requires a secure session and initiate the user subscription or registration by transmitting a bootstrapping request to the user equipment.

The bootstrapping information request sent from the network application function node to the bootstrapping server function node may include an indicator for push services.

The network application function node may further receive a push service authorization from the bootstrapping server function node in response to the bootstrapping information request (step 12).

The network application function node, when communicating with the bootstrapping server function node, may use a privacy protected identifier received from the user equipment instead of the user identifier.

The network application function node may apply a user's stored service related information for the initiation of a subsequent bootstrapping service request to the bootstrapping server function node.

Another aspect of the invention relates to a computer program comprising computer readable code means, which when run on a communication network node, cause the communications network node to perform the preceding method.

According to a further aspect of the invention a computer program product comprises a computer-readable medium on which this computer program is stored.

According to a sixth aspect of the invention a communication network node comprises a bootstrapping server function for secure user subscription or registration to a service at least partly enabled in a network. The communication network node comprises third communication means for communicating with a user equipment. Fourth communication means are foreseen for communicating with a network application function node. Second storage means are provided for storing a received user profile, and a bootstrapping transaction identifier. Means are foreseen for receiving from a network application function node a bootstrapping information request comprising a bootstrapping transaction identifier. The node further comprises means for generating a network application key for the network application function and providing the network application key with user information to the network application function node.

The communication network node may further comprise fifth communication means for communicating with a home subscriber system node. Means may be provided for sending an authentication request based on the user identity to the home subscriber system node upon receipt of a bootstrapping service request comprising a user identity from a user equipment. Further, means may be foreseen for generating a bootstrapping transaction identifier, upon receipt of the multimedia authentication answer comprising the user profile from the home subscriber system node, and transmitting it to the user equipment.

The communication network node may further comprise means for receiving an indicator for push services when receiving the bootstrapping information request from the network application function node.

The communication network node may further comprise means for determining from the user profile if the user is authorized for the requested service. If service authorization is comprised in the user profile, a service authorization is transmitted to the network application function node. In the case of negative authorization information, or if the profile does not comprise authorization information for the requested service, service authorization is declined.

The communication network node may further comprise means for verifying if the received user profile comprises a privacy indicator, and means for generating a privacy protected identifier for the user equipment and transmitting it to the user equipment with the bootstrapping transaction identifier.

The communication network node may further comprise means for determining the user identifier, if a privacy protected identifier has been received instead of a user identifier in a request from the network application function.

A seventh aspect of the invention relates to a method of operating a bootstrapping server function node for secure user subscription or registration process to a service at least partly enabled in a network. The bootstrapping server function node stores a user profile, and a bootstrapping transaction identifier. The bootstrapping server function node receives from a network application function node a bootstrapping information request comprising the bootstrapping transaction identifier. The bootstrapping server function node then generates a network application key for the network application function node and provides the network application key with service related information from the stored user profile to the network application function node.

Upon receipt of a bootstrapping service request and user identity from a user equipment, the bootstrapping server function node may send an authentication request based on the user identity to a home subscriber system node. Upon receipt of the multimedia authentication answer comprising a user related profile from the home subscriber system node, the bootstrapping server function node may generate a bootstrapping transaction identifier and transmit it to the user equipment.

The bootstrapping information request sent from the network application function node to the bootstrapping server function node may include an indicator for push services.

The method may further comprise the step of determining from the user profile if the user is authorized for the requested service, and if so, transmitting a service authorization to the network application function node.

The stored user profile may further comprise a privacy indicator. Upon receipt of the multimedia authentication answer comprising a user profile with privacy indicator, the bootstrapping server function node may further generate a privacy protected identifier for the user equipment when generating the bootstrapping transaction identifier and transmit both to the user equipment. The privacy protected identifier may take the place of the user equipment identifier in the subsequent steps when communicating with the network application function node.

The bootstrapping server function node may determine the user identifier, if a privacy protected identifier has been received instead of a user identifier in a request from the network application function node.

The stored user profile may comprise one of the following:
a user equipment identifier;
a user equipment transport identifier; or
a bootstrapping server function address for the requested service.

The stored user profile may further comprise an application identifier.

According to a another aspect of the invention a computer program comprises computer readable code means, which when run on a communication network node, cause the communications network node to perform the foregoing method.

A further aspect of the invention relates to a computer program product which comprises a computer-readable medium on which this computer program is stored.

According to a tenth aspect of the invention a communication network node comprises a home subscriber system for securing a user subscription or registration process in a network. The communication network node comprises sixth communication means for communicating with a bootstrapping server function node. Third storage means are provided for storing a user profile. A database is foreseen for retrieving the stored user profile and transmitting an authentication answer comprising the user profile to the bootstrapping server function node in response to an authentication request received from the bootstrapping server function node.

An eleventh aspect of the invention relates to a method of operating a home subscriber system node when securing a user subscription or registration process in a network. The home subscriber system node stores a user profile. In response to an authentication request received from the bootstrapping server function node, the home subscriber system node retrieves the stored user profile and transmits an authentication answer comprising the user profile to the bootstrapping server function node.

The stored user profile may further comprise a privacy indicator.

The stored user profile may be comprised in stored user security settings.

The stored user profile may comprise at least one of the following:
a user equipment identifier;
a user equipment transport identifier; or a bootstrapping server function address for the requested service.

The stored user profile may further comprise an application identifier.

Another aspect of the invention relates to a computer program comprising computer readable code means, which when run on a communication network node, cause the communications network node to perform the foregoing method.

A further aspect of the invention relates to a computer program product which comprises a computer-readable medium on which this computer program is stored.

Further disclosed is, inter alia, a method for user/UE subscription/registration to a first NAF service. The method comprises the steps of:

sending a service subscription/registration request from a UE, which supports GBA, to a first NAF that enables the first NAF service, initiating, by the first NAF, execution of the user/UE subscription/registration to the NAF service that utilizes a GBA push function and is supported by the first NAF, in a GBA secured session, retrieving, from an HSS to a first BSF over a Zh reference point, information about the user/UE, wherein the information comprises a UEid for a GBA push request to the BSF, at least one UE Transport ID for GBA push delivery method to the UE and a BSF address for the second NAF service, storing the retrieved information about the user/UE and a B-TID in the first BSF, sending the information about the user/UE from the first BSF to the first NAF, and storing the information about the user/UE in the first NAF.

In one embodiment of the method the information about the user/UE comprises a UICC application to use for the GBA push function related to the NAF service.

The method may also comprises the step of retrieving, from the HSS to the first BSF, over the Zh reference point, an AV and GUSS information for the UE as currently defined in 3GPP.

The method may also comprise the steps of:

sending a profile indicator (also called "push indicator" in the detailed description) from the first NAF to the first BSF, determining, by the BSF, based on the profile indicator, an association between the information about the user/UE and a certain NAF, which could be the first NAF or a second NAF, before the information about the user/UE is sent from the first BSF to the first NAF.

The method may comprise the step of, instead of sending the UEid from the first BSF to the first NAF, sending an altered UEid, wherein the altered UEid is a cryptographic transformation of the UEid sent from, the HSS. The altered UEid may be created by the first BSF based on an additional indication contained in the information about the user/UE sent from the HSS.

The UEid may be IMPI, IMSI, IMPU or MSISDN.

The BSF address may be the address to a second BSF or the first BSF.

The UEid, the UE Transport ID and the BSF address may be comprised in the GUSS information.

Disclosed is also a communications network node comprising an HSS. The HSS has a storage means that comprises, associated with an IMPI, at least the following information:

a UEid, comprising at least one of IMSI and IMPU for GBA Push requests to a BSF, UE Transport Id(s) for a GBA Push delivery method to the UE per NAF, e.g. MSISDN for SMS/MMS and IMPU, a BSF Address for Push Services, and UICC Application to use for GBA Push service, if known to the HSS.

The communications network node also comprises means for sending the information to the BSF.

In one embodiment of the communications network node, the information belongs to a profile used by at least one GBA-Push service. The profile can be structured so GBA-Push services may be configured differently for different NAFs, for example, Push services for different NAFs may be handled by different BSFs or towards different UE Transport Ids.

Disclosed is also a communication network node comprising a NAF, which enables a service that may require use of GBA-Push mechanisms/actions/functions and comprises first communication means for communication with a UE, second communication means for communication with a BSF, means for initiating user subscription/registration to the service under the scope of a GBA secured session, and means for sending a bootstrapping information request comprising a an indication adapted to be used by the BSF to determine a valid user profile used by at least one GBA-push service provided by the NAF.

In one embodiment the NAF uses the IMPI and the BSF address used during the execution of the GBA procedures also for the execution of subsequent GBA-Push procedures. The NAF may get a UE-Transport Id from the User/UE directly within the subscription/registration process. The related GUSS information may be provided to the NAF during the GBA procedure and may indicate the User Identity the NAF may use for GBA-Push services towards that user.

Disclosed is also a communications network node comprising a BSF. The BSF may include an indication of whether the NAF is authorized to provide GBA-push services to that user or even whether the User is enabled for GBA-Push services at all.

The BSF may comprise encryption means for transforming a received UEid into an altered UEid comprised in a GBA-push Service profile addressed to a NAF and received from the HSS, and sending means for sending the altered UEid to the NAF instead of the received UEid.

The BSF may comprise determining means for determining whether the GBA-push Service profile comprises a privacy indication, and based on the privacy indication determine if the encryption means shall generate the altered UEid.

The encryption means may use a crypto transform to create the altered UEid based on an IMPI/IMSI of a UE associated with the UEid.

BRIEF DESCRIPTION OF THE DRAWINGS

The objects, advantages and effects as well as features of the present invention will be more readily understood from the following detailed description of exemplary embodiments of the invention when read together with the accompanying drawings, in which.

DETAILED DESCRIPTION

Figure 1:
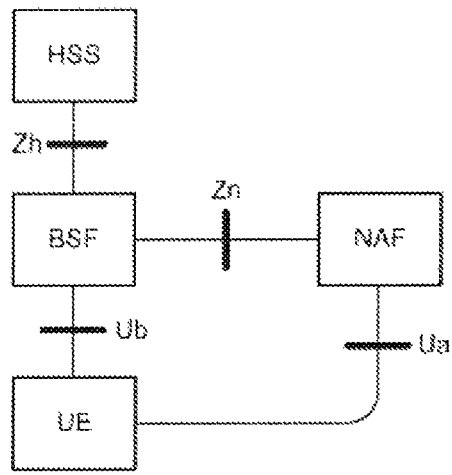
FIG. 1 shows a schematic view of a standardized network model for bootstrapping.

In the following embodiments discussed in more detail, the service requested by the user preferably is a GBA-Push Service. The user profile is advantageously implemented as a GBA-Push Service Profile, and the user identity typically is an IMPI.

While the invention covers various modifications and alternative constructions, embodiments of the invention are shown in the drawings and will hereinafter be described in detail. However it is to be understood that the specific description and drawings are not intended to limit the invention to the specific forms disclosed.

The invention proposes to leverage on the existing GBA infrastructure and flows, in order to enable the exchange of required information in support of subsequent execution of GBA Push services. Note that all GBA Push enabled MEs (Mobile Equipments)/UEs are required to support normal GBA.

According to the present invention, a NAF initiates or forces the execution of a user subscription/registration to a NAF service, e.g. a Football results broadcast, downloading of vouchers (discount tickets), tokens and even security keys, to end-users, which will later require the use of GBA Push mechanisms, e.g. Push delivery of a key to access/watch the service, within the context of a GBA secured session.

A number of enhancements are hereby, according to an embodiment of the invention, proposed to current GBA procedures defined in 3GPP GBA TS 33.220 in order to provide the NAF with the required information which will enable the later execution of GBA Push Services from a specific NAF to a specific user. Proposed enhancements are, inter alia:

A user profile is defined, preferably a "GBA-Push Service Profile", including the required information for the NAF to initiate later execution of GBA Push Services towards the UE.

New mechanisms over interface Zh between the BSF and an HSS and interface Zn provide for the delivery of the GBA-Push Service Profile to the NAF.

Additionally, the proposed enhancements may enable the exchange of information for early NAF/User Authorization for GBA-Push services, as well as Privacy Protection of User's Private Identities.

Furthermore a new "Push-Indicator" provided by the NAF to a BSF over interface Zn between the NAF and the BSF may be provided in order to indicate to the BSF that the NAF requires information on the GBA-Push profile for that user/UE.

Embodiments providing the proposed enhancements to current GBA mechanisms in support to GBA Push services are described with the text below in conjunction with FIG. 5. In a first step 501 a user service subscription/registration request is sent as an http request from a UE 1 to a NAF 2 over a Ua interface/reference point.

The further subscription to NAF services may be executed within a GBA Secured Session. In Step 502 of FIG. 5, the NAF 2, which in this case provides user services which may require the further use of GBA-Push mechanisms, initiates or forces the execution of the user subscription/registration to the service under the scope of a GBA secured session. This enables the execution of the enhancements to GBA procedures further described in the following.

A user profile, preferably in the form of a GBA-Push Service Profile, can be stored, per user identity, e.g. IMPI, together with the rest of the user's subscription at the user's HSS 3.

This GBA-Push Service Profile contains the required information to enable the execution of GBA-Push services towards a specific user. The GBA-Push Service Profile may include in an advantageous embodiment at least:

a user identity UEid, comprising at least one of IMSI and IMPU for GBA Push requests to a BSF.

UE Transport Id(s) for GBA Push delivery method to the UE per NAF. For example MSISDN for SMS/MMS, IMPU, etc. The GBA-Push Service profile may contain all possible UE_Transport Ids enabled for a user/NAF known to a person skilled in the art.

a BSF Address for Push Services. GBA-Push procedures may use a different BSF instance than the BSF instance used for normal GBA procedures.

Optionally, the GBA-Push Service Profile may also include a UICC Application to use for GBA Push service, if it is known to the HSS.

The GBA-Push Service Profile can be structured, so that GBA-Push services may be configured differently for different NAFs. For example, Push services for different NAFs may be handled by different BSFs or towards different UE Transport Ids.

The BSF download of the user profile is described in the following. The NAF 2 initiates or triggers in step 502 the execution of the user subscription/registration to the NAF service within a secured GBA session. According to an advantageous embodiment, the NAF 2 transmits a bootstrapping request in the form of an http response to the user equipment 1 in a third step 503. The user equipment 1 then sends a bootstrapping service request based on the user identity to the BSF 4 in a fourth step 504. The BSF 4 requests in a fifth step 505 the GBA-Push Service Profile of one specific user by sending a MAR (Multimedia Authentication Request) with the corresponding user identity, e.g. in the form of IMPI, to the HSS 3 over the interface/reference point Zh. In a sixth step 506, the HSS 3 retrieves the user related GBA-Push Service Profile together with a related AV (Authentication Vector), which may typically comprise RAND (Random Challenge in Authentication), AUTN (Authentication token), XRES (Expected response in Authentication), CK (Confidentiality key) and IK (Integrity Key), as well as GUSS (GBA User Security Settings) for that user/UE identity, e.g. based on his IMPI. In a seventh step 507 the HSS 3 returns, in a MAA (Multimedia Authentication Answer) the AV, the GBA-Push Service Profile and the GUSS. Alternatively, the GBA-Push Service Profile may be part of GUSS information.

In an eighth step 508, a GBA-AKA execution involving RAND and/or AUTN is performed between the BSF 4 and the UE 1 to generate, amongst others, Ks (Key Material) and B-TID.

In the UE 1, key Ks is obtained from concatenated Ck and Ik, and Ks_NAF is generated. At the same time, in step 509a, the BSF 3 also obtains Ks from concatenated Ck and Ik, but, moreover, BSF 3 also generates a B-TID associated to the GUSS and the GBA-Push Service Profile.

Figure 5:
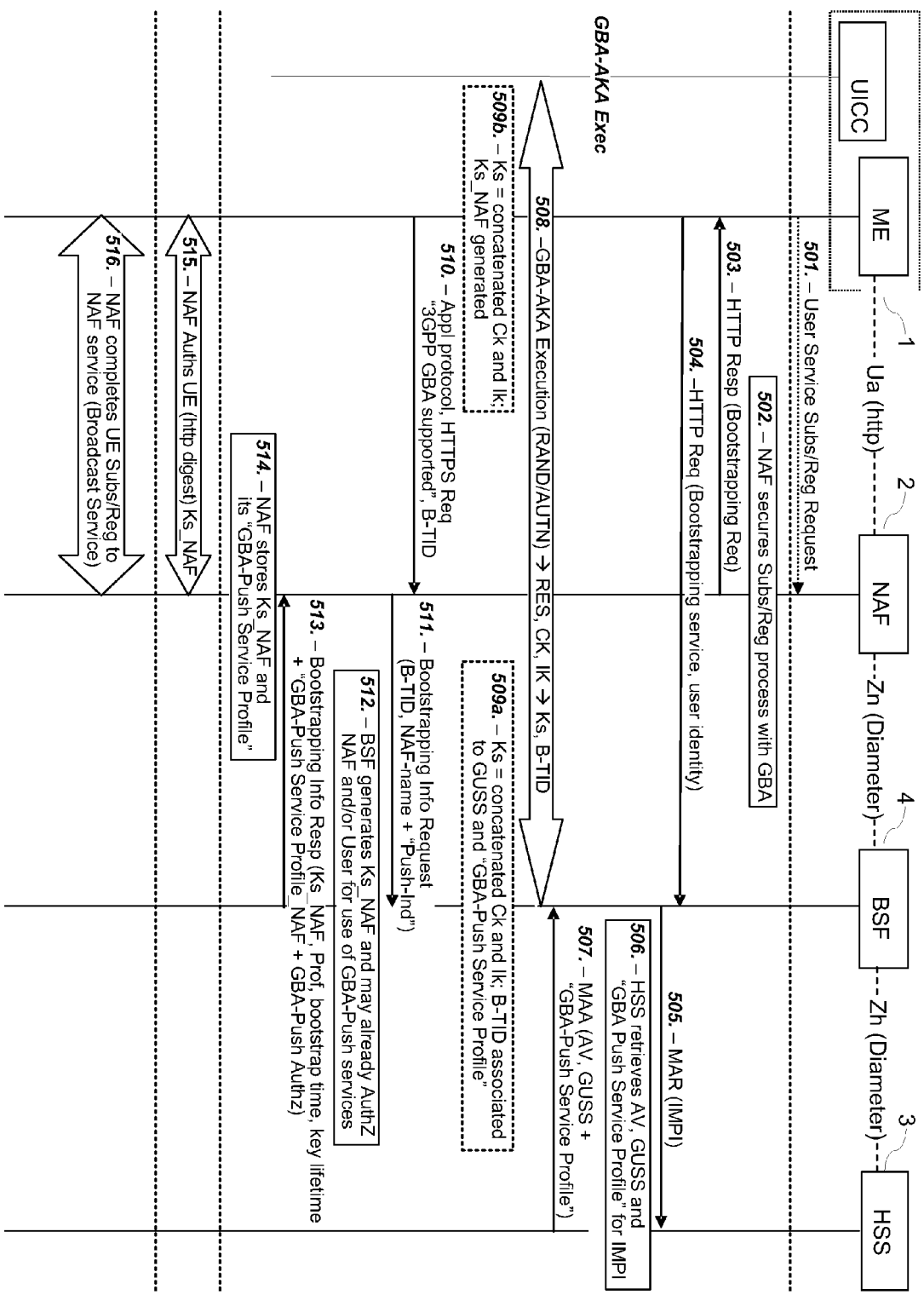
FIG. 5 shows a sequence diagram illustrating signals according to an embodiment of the invention, FIG. 6 schematically shows an embodiment of a NAF, FIG. 7 schematically shows an embodiment of a BSF, and FIG. 8 schematically shows an embodiment of a HSS.

The GBA-Push Service Profile is then stored at the BSF 4 together with a B-TID during the lifetime of the rest of GBA Bootstrapping info in step 509a in FIG. 5. The BSF 4 will then be able to use the stored GBA-Push Service Profile for future NAF requests. In some embodiments these may originate from multiple different NAFs, using that B-TID and requiring GBA Push service profile information.

The UE 1 then submits to the NAF 2 an application protocol https request with an indication that enhanced GBA services are supported, e.g. 3GPP GBA supported", and the bootstrapping transaction identifier B-TID.

The NAF 2 retrieves the GBA-Push Service Profile as follows. In step 511 the NAF 2 sends a Bootstrapping Info Request to the BSF 4, comprising the B-TID and the NAF name.

In an advantageous embodiment, the NAF 2, which may later on require the execution of GBA-Push mechanisms, may further include a new indicator, hereinafter called "GBA-Push Indicator", within the Bootstrapping Info Request to the BSF 4, as shown in step 511 in FIG. 5. This indicator may be used by the BSF 4 to determine the GBA-Push Service Profile relevant to a specific NAF 2. In step 512, the BSF generates a key Ks_NAF for the NAF. Moreover, the BSF 4 may already authorize the NAF or the User for the use of GBA-Push services. Since the GBA-Push Service Profile received from the HSS 3 and stored at the BSF 4 may be different for different NAFs, e.g. different UE_Trp, i.e. transport address used for delivery of GPI (GBA Push Information) to the UE, or even different BSF instances for different type of NAF services utilizing GBA-Push services, the BSF 4 provides only the portions of the GBA-Push Service Profile relevant to each NAF, which is illustrated in Step 513 of FIG. 5. The bootstrapping info response comprises Ks_NAF, Prof, bootstrap time, key lifetime, and the GBA-Push Service profile related to the NAF service.

In an alternative approach, the NAF 2 may not need to explicitly indicate the GBA-Push Indicator proposed above with the request for the GBA-Push Service Profile and the BSF 4 provides the GBA-Push Service Profile relevant to the NAF only if it exists.

The NAF 2 uses the retrieved GBA-Push Service Profile in the following manner. The NAF stores the received "GBA-Push Service Profile" for that user (step 514 in FIG. 5) and Ks_NAF and completes the GBA mechanism.

The NAF 2 may then use the bootstrapping information to authenticate the user/UE via http digest and secure the channel for the completing the user subscription to the NAF service according to what is commonly known in the art via e.g. 3GPP GAA TS 33.222 (step 515 and 516 in FIG. 5). The subscription or registration result may depend on the GBA-Push Service profile received from the BSF, e.g. when UE/NAF is not authorized or enabled for GBA-Push Services.

According to this embodiment the basic usage the NAF 2 can make of the received GBA-Push Service Profile is to initiate subsequent GBA-Push services towards that user. The information can be used for the GBA Push Info (GPI) request to the BSF 4 over reference point Zpn (step 402 in FIG. 4) with no modification as currently defined in GBA-Push TS 33.223.

From the point of view of the user this enables that the subscription/registration process to the NAF service takes place without the need for the user to provide explicitly personal information to the NAF 2 as this will be gathered automatically within the user's GBA-Push Service Profile received from the BSF 4.

According to an embodiment it is additionally proposed that the GBA-Push Service Profile information received by the NAF 2 is used for early NAF/User authorization to GBA-Push services and for Privacy protection of Private user identifiers as described in more detail in the next sub-sections.

This advantageous embodiment allows for early NAF/User Authorization for GBA-Push Services. The user's GBA-Push Service Profile information may be used for Early NAF/User Authorization for GBA-Push services during user subscription/registration to the NAF service.

The BSF 4 may already use the GBA-Push Service Profile information for a particular NAF 2 (received in step 511 of FIG. 5) to authorize NAF/User for GBA-Push services (step 512 in FIG. 5).

In its bootstrapping info response to the NAF 2 (step 513 in FIG. 5), the BSF 54 may further include an indication (GBA Push Authz) of whether the NAF is authorized to provide GBA-push services to that user or even whether the User is enabled for GBA-Push services at all.

Alternatively, the absence of "GBA-Push Service Profile" information in response to the NAF may mean that either the NAF 2 or the UE 1 are not authorized/enabled for GBA-Push.

The NAF 2 may use this knowledge while completing the user subscription/registration procedure to the NAF service (step 515 in FIG. 5). Possible options when GBA-Push is not enabled may be:

NAF gets configured to run GBA (instead of GBA-Push) for that user. Accordingly, the NAF may provide the following instructions to the user:

"Subscription completed successfully. In order to provide NAF service please log in into NAF to trigger provision of required Keys/Tokens/Voucher (using traditional GBA)".

NAF may prompt the user with a message like:

"The subscription could not be completed. Please contact your operator to enable GBA-Push (or a rather fancy 'translation' of the meaning into something the layman user will actually understand).

The invention also proposes to protect the Privacy of Private User Identities. GBA considers situations where the NAF may be restricted from handling user's Private Identities due to privacy reasons. According to an embodiment the same requirements/restrictions shall apply to GBA Push.

For such a case, the NAF 2 may be provided with a "Privacy Protected Private Id" or "Pseudonym" replacing the UEid in GBA Push requests to the BSF 4 instead of using plain IMPI/IMSI.

The BSF 4 may create this "pseudonym" (in step 512 in FIG. 5) based on additional indication contained in the "GBA-Push Service Profile" for that NAF (i.e. a Privacy-Indicator may be provided) received from HSS (in step 507 in FIG. 5).

The BSF 4 may e.g. make use of a crypto transform to create the "pseudonym" based on the IMPI/IMSI, so that the BSF 4 is capable to decipher and get the identifier back in plain without having to store it.

The BSF 4 then includes this privacy protected identifier, or "pseudonym" instead of the UEid in the GBA-Push Service Profile provided to the NAF 2 (in step 13 in FIG. 5). The NAF 2 will then later on use this privacy protected identifier, or "p-seudonym" as UEid in a GPI request to the corresponding BSF 4 via reference point Zpn (step 402 in FIG. 4). When received, the BSF 4 will decipher the privacy protected identifier to obtain the user's IMPI and proceed with the rest of GBA-Push procedures as defined in 3GPP GBA-Puss TS 33.223 and known in the art.

Figure 6:
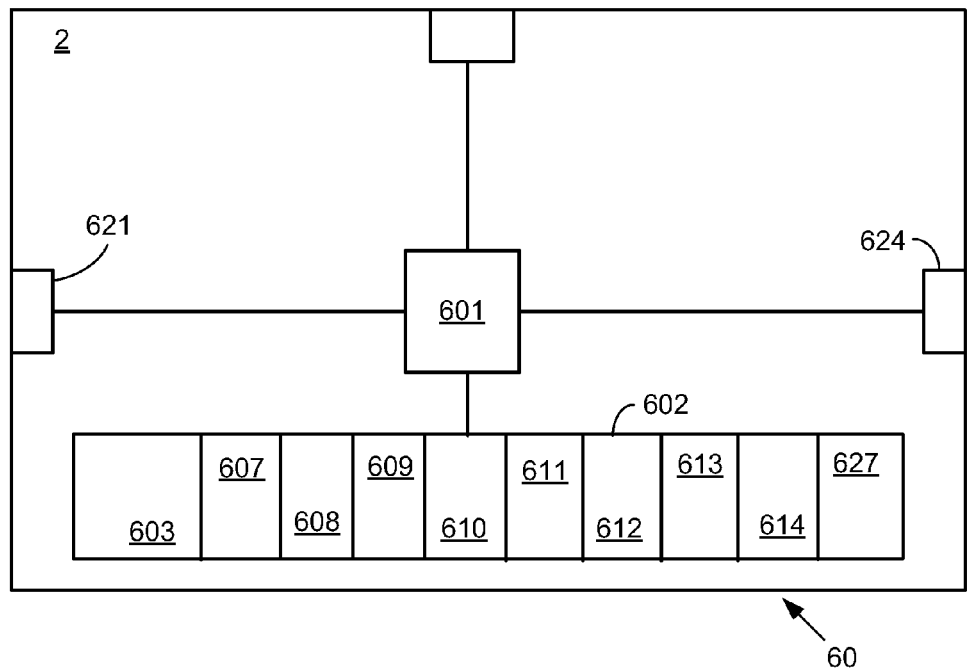

FIG. 6 schematically shows an embodiment of a communications network node 60 in the form of a computer comprising the NAF 2. The NAF parts relevant for embodiments for the invention are implemented here at least partly as modules of a NAF computer program stored in the communications node 60, and executed by a processing unit 601, but they may of course also be partly implemented as hardware circuits and firmware. The NAF computer program 603 is stored in a computer program product in the form of a memory 602, such as a hard disk, ROM (Read-Only Memory), Flash, PROM (Programmable ROM), EPROM (Erasable PROM), EEPROM (Electronically Erasable PROM), or other nonvolatile memories. The NAF communications node comprises communication means 607, operatively connected to an interface 621 for adapting the NAF computer to communicate with the UE over a Ua interface/reference point with HTTP (Hypertext transfer protocol) messages. The communications node also comprises communication means 608, operatively connected to an interface 624 for adapting the NAF computer to communicate with the BSF over a Zn interface/reference point with the help of the Diameter protocol. The communication means 607 and 608 may be implemented as software and be included in the NAF computer program 603. The computer in FIG. 6 is depicted with two separate interfaces or communication ports 621 and 624, one for communication with a UE and one for communication with a BSF. It shall, however, be understood that the UE and the BSF interface, if they are implemented as software, could of course adapt the computer to communicate with the UE and the BSF via a single physical port.

Means 610 are foreseen for transmitting a bootstrapping information request comprising a bootstrapping transaction identifier to the bootstrapping server function node upon receipt of a secure application request comprising the bootstrapping transaction identifier from the user equipment. The NAF computer program 603 also comprises code means/as program module 627 to receive and store a network application key Ks_NAF and service related information from a GBA-Push service profile received from the bootstrapping server function node. The received information and the associated network application key may also be stored in another computer connected and associated with the NAF. Means 628 are provided for completing the secure user subscription to the service based on the service related information and the network application key.

The communications network node 60 may further comprise means 609 for initiating the secure user subscription or registration and transmitting a bootstrapping request to the user equipment in response to a secure user subscription or registration request received from the user equipment. The node 60 may further comprise means 611 for including an indicator for push services when sending a bootstrapping information request to the bootstrapping server function node. The NAF node 60 may also comprise means 612 for receiving a push service authorization from the bootstrapping server function in response to the bootstrapping information request.

The communications network node 60 may further comprise means 613 for using a privacy protected identifier received from the user equipment instead of the user identifier, when communicating with the bootstrapping server function.

Figure 7:
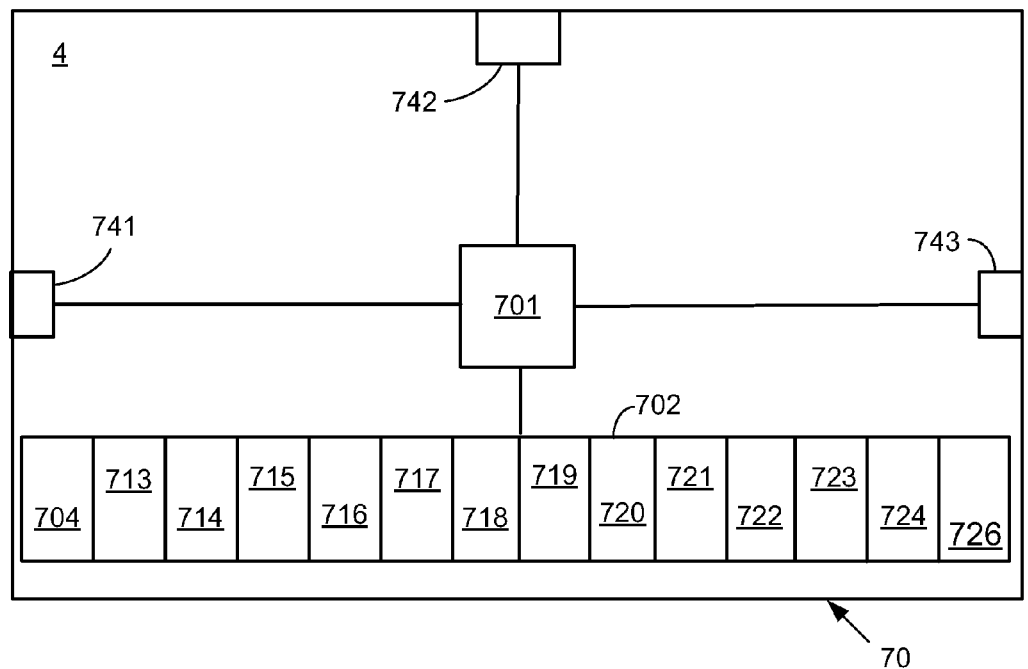

The communications network node 60 may further comprise means 614 for using a user's stored service related information for initiating a subsequent bootstrapping service request for the same user to the bootstrapping server function node;

FIG. 7 schematically shows an embodiment of a communications network node 70 in the form of a computer comprising the BSF 4. The BSF parts relevant for embodiments for the invention are implemented here at least partly as modules of a BSF computer program 704 stored in the communications node 70, and executed by a processing unit 701, but they may of course also be partly implemented as hardware circuits and firmware. The BSF computer program 704 is stored in a computer program product in the form of a memory 702, such as a hard disk, ROM (Read-Only Memory), Flash, PROM (Programmable ROM), EPROM (Erasable PROM), EEPROM (Electronically Erasable PROM), or other nonvolatile memories. The BSF communications node comprises third communication means 713, operatively connected to an interface 741 for adapting the BSF computer to communicate with the UE over a Ub interface/reference point. The communications node 70 also comprises fourth communication means 714, operatively connected to an interface 742 for adapting the BSF computer to communicate with the NAF over a Zn interface/reference point with the help of the Diameter protocol. The communications node 70 may further comprise fifth communication means 715, operatively connected to an BSF-UE interface 743 for adapting the BSF computer to communicate with the HSS over a Zh interface/reference point with the help of the Diameter protocol. The third, fourth and fifth communication means 713, 714, and 715 may be implemented as software and be included in the NAF computer program. The computer in FIG. 7 is depicted with three separate communication ports 741, 742, 743, one for communication with a UE, one for communication with a BSF, and one for communication with a HSS. It shall, however, be understood that the BSF-UE, BSF-NAF, and BSF-HSS interfaces 741, 742, if they are implemented as software, could of course adapt the computer to communicate with at least two of the interfaces implemented via a single physical port.

Second storage means 726 are provided for storing a received GBA-Push Service Profile, and a bootstrapping transaction identifier. Means 721 are foreseen for receiving from a network application function node a bootstrapping information request comprising the bootstrapping transaction identifier. The node further comprises means 718 for generating a network application key for the network application function and providing the network application key with user information to the network application function node.

Means 719 may be provided for sending an authentication request based on the user identity to the home subscriber system node upon receipt of a bootstrapping service request comprising a user identity from a user equipment. Further, means 720 may be foreseen for generating a bootstrapping transaction identifier, upon receipt of the multimedia authentication answer comprising the GBA-Push Service Profile from the home subscriber system node3, and transmitting it to the user equipment 1.

The node 70 may further comprise means 716 for receiving an indicator for push services when receiving the bootstrapping information request from the network application function node. Authorization means 722 may determine from the GBA-Push Service Profile if the user is authorized for the requested service. If service authorization is comprised in the GBA-Push Service Profile, a service authorization is transmitted to the network application function node. In the case of negative authorization information, or if the profile does not comprise authorization information for the requested service, service authorization is declined.

The node 74 may further comprise means 717 for verifying if the received GBA-Push Service Profile comprises a privacy indicator, as well as means 724 for generating a privacy protected identifier for the user equipment and transmitting it to the user equipment with the bootstrapping transaction identifier. Advantageously, the BSF node 70 further comprises means 723 for determining the user identifier, if a privacy protected identifier has been received instead of a user identifier in a request from the network application function node.

The GBA-Push Service Profile and a B-TID may be stored in the BSF computer program product or in another memory or database in the BSF computer.

Figure 8:
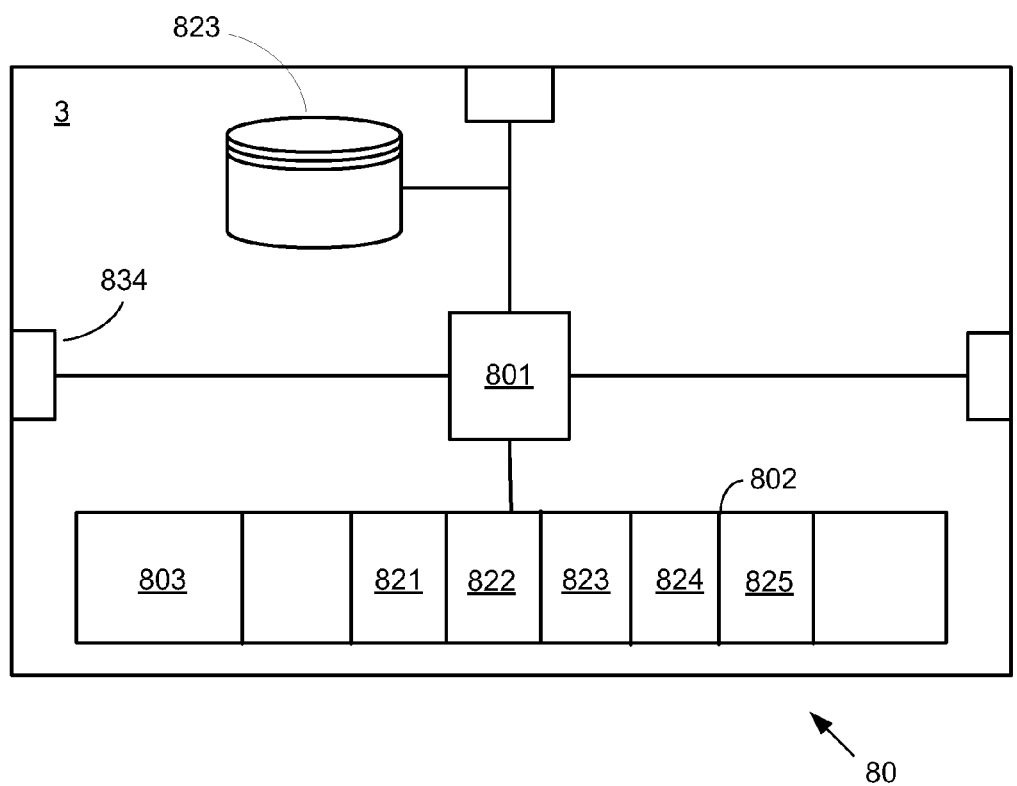
Figure 1:
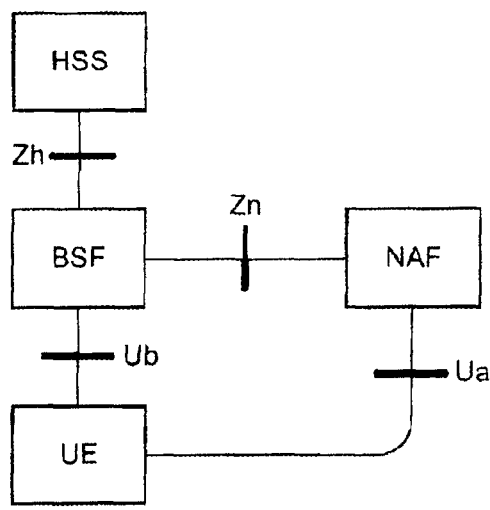
Figure 3:
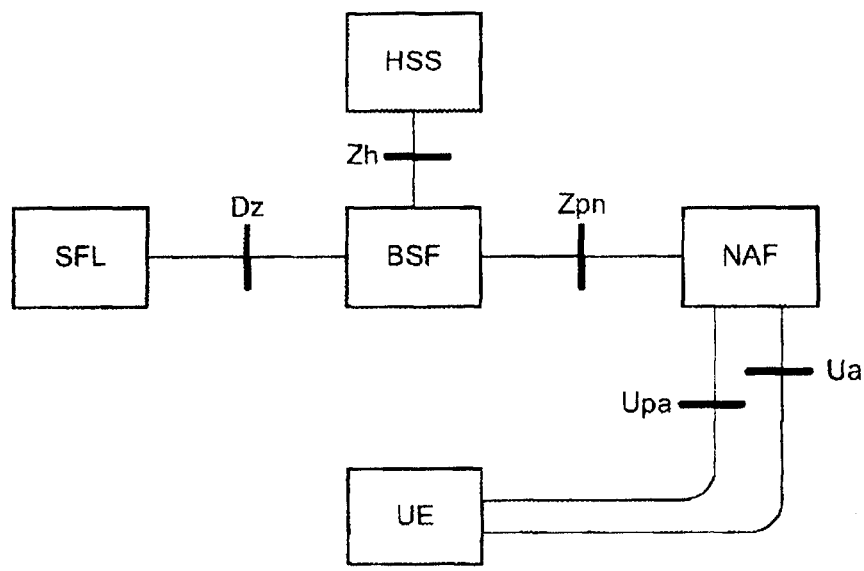
Figure 2:
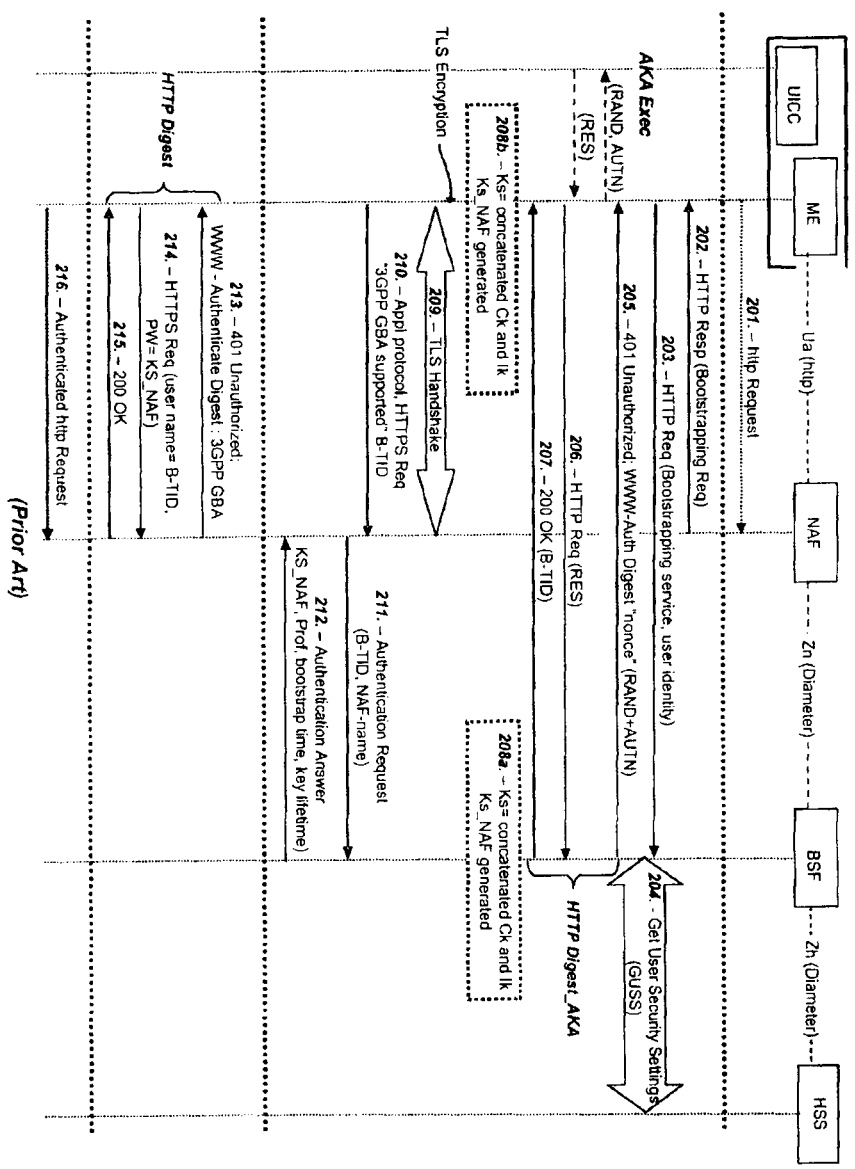
Figure 4:
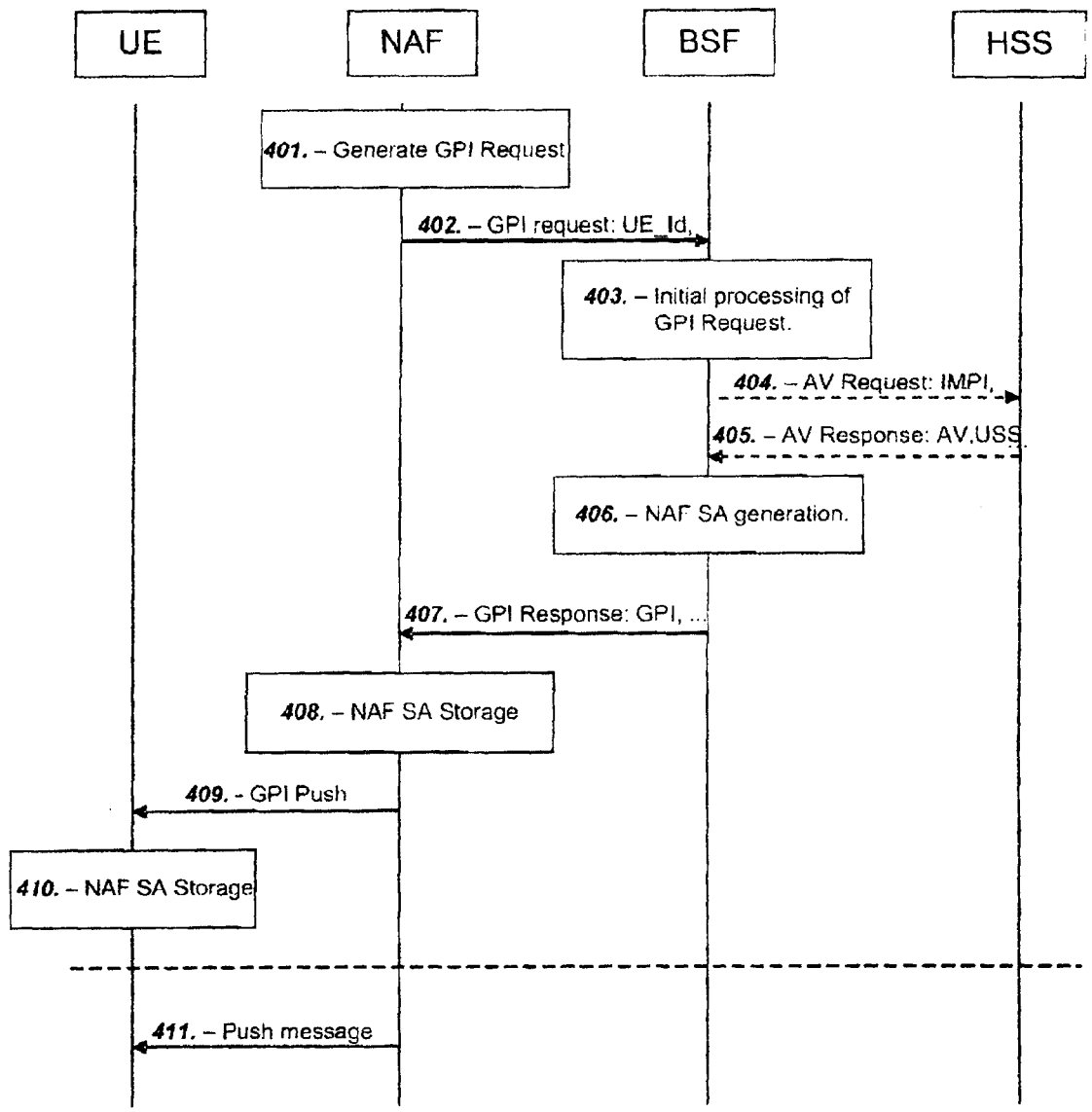

FIG. 8 schematically shows an embodiment of a communications node 80 in the form of a third computer comprising the HSS 3. The HSS parts relevant for embodiments for the invention are implemented here at least partly as modules of an HSS computer program stored in the communications node 80, and executed by a processing unit 801, but they may of course also be partly implemented as hardware circuits and firmware. The HSS computer program 803 is stored in a computer program product in the form of a memory 802, such as a hard disk, ROM (Read-Only Memory), Flash, PROM (Programmable ROM), EPROM (Erasable PROM), EEPROM (Electronically Erasable PROM), or other non-volatile memories. The HSS communications node comprises sixth communication means 821, in the form of an interface 834 for adapting the HSS computer to communicate with the BSF over a Zh interface/reference point with the help of the Diameter protocol. The HSS communications node may also comprise a HLR communication means 822 in the form of an interface or an HLR proxy for communication with the help of a protocol such as SIGTRAN. The HSS computer also comprises third storage means/memory 823 associated with a database or database interface 824 for storing at least one GBA-Push Service Profile for at least one IMPI. It shall however also be understood that the database does not has to be positioned physically in the HSS computer, but may be another computer connected to the HSS computer.

The HSS communications node 80 also comprises means 825 for retrieving a GBA Push Service Profile associated with a received IMPI from the database and send the GBA-Push Service Profile to the BSF.

In an additional embodiment, a simplified method for basic "GBA-Push Service Profile" information is exchanged with minimum impact on currently defined GBA interfaces and procedures. This may present an interesting approach from standardization point of view as standardization impacts are minimal.

In this simplified embodiment, the NAF also initiates or forces the user's subscription/registration to a NAF service which may request subsequent execution of GBA-Push procedures over a GBA secured session. The NAF collects the needed information to run the subsequent GBA-Push procedures during the execution of the GBA procedures. However in this simplified case there will be no need for the HSS to store and distribute the GBA-Push Service Profile as such.

According to this additional embodiment, the NAF shall use the IMPI and the BSF address used during the execution of the GBA procedures also for the execution of subsequent GBA-Push procedures.

In this simplified embodiment, the NAF may get the UE-Transport Id from the User/UE directly within the subscription/registration process. The related GUSS information may here be provided to the NAF during the GBA procedure and may indicate the User Identity the NAF may use for GBA-Push services towards that user.

The embodiments in accordance with the present invention may offer at least some of the following advantages.

The execution of the User subscription/registration to a NAF service within a GBA secured session according to at least one of the embodiments of the present invention may enable smooth execution of further NAF initiated GBA-Push procedures for that specific UE as it is ensured that the NAF is aware of the required information for the execution of GBA-Push procedures (e.g. UEid, UE_Trp, BSF Add) in advance before the execution of the GBA-Push service is required.

Early NAF/User authorization for GBA-Push services already during the subscription/registration process may also be enabled. This may help optimization of the Subscription/registration process and NAF service in general, as the NAF will be aware of the possibility to use GBA-push already at the time of receiving the service Subscription/Registration request.

Moreover, system performance may be enhanced, as the number of failed GBA-Push procedures due to NAF/User Authorization issues will be reduced.

Furthermore, user experience may be enhanced, since the user will not be required to provide personal information for the delivery of the NAF service. Additionally, the NAF will be able to provide useful information e.g. on the result of the Subscription/Registration process (e.g. may fail if GBA-Push not available). Also, useful information may be provided regarding how the NAF service will be delivered (e.g. if GBA-Push is not available, the user may be asked to log in to the NAF later on, so that Keys/Tokens/Vouchers can be delivered with traditional GBA).

Finally, the invention may provide for privacy protection of private identities in GBA-Push services.

The invention claimed is:

1. A method for secure user subscription or registration to a service at least partly enabled in a network, the network comprising a user equipment configured to perform generic bootstrapping, a network application function for providing the service, and a bootstrapping server function for storing a service profile, the service profile comprising information relating to particular details for enabling the execution of the service provided by the network application function for the user equipment, the method comprising:

responsive to receiving a bootstrapping service request from the user equipment that comprises a user identity, sending an authentication request from the bootstrapping server function to a home subscriber system based on the user identity;

responsive to receiving the authentication request from the bootstrapping server function, retrieving the service profile at the home subscriber system based on the user identity and transmitting an authentication answer from the home subscriber system to the bootstrapping server function, the authentication answer comprising the service profile;

responsive to receiving the authentication answer from the home subscriber system, generating at the bootstrapping server function a bootstrapping transaction identifier and a privacy protected identifier that identifies the user equipment in communications between the bootstrapping server function and the network application function, and communicating the bootstrapping transaction identifier to the user equipment;

storing the service profile and the bootstrapping transaction identifier at the bootstrapping server function, wherein the stored service profile further comprises a privacy indicator;

responsive to receiving a secure application request from the user equipment that comprises the bootstrapping transaction identifier, transmitting a bootstrapping information request from the network application function to the bootstrapping server function, the bootstrapping information request comprising the bootstrapping transaction identifier;

responsive to receiving the bootstrapping information request from the network application function, generating at the bootstrapping server function a network application key for the network application function, and providing the network application key and service-related information from the stored service profile to the network application function, the service-related information required by the network application function to actually execute the service after the user equipment is at least one of authenticated and authorized for the service;

storing the network application key and the service-related information at the network application function;

completing the secure user subscription or registration to the service at the network application function based on the received network application key;

executing the service for the user equipment based on the received service-related information; and including the privacy protected identifier in place of the user identity at the network authentication function when communicating with the bootstrapping server function.

2. The method according to claim 1, wherein the network further comprises a home subscriber system storing the service profile, and wherein the method further comprises:

responsive to receiving a bootstrapping service request from the user equipment that comprises a user identity, sending an authentication request from the bootstrapping server function to the home subscriber system based on the user identity;

responsive to receiving the authentication request from the bootstrapping server function, retrieving the stored service profile at the home subscriber system based on the user identity and transmitting an authentication answer from the home subscriber system to the bootstrapping server function, the authentication answer comprising the stored service profile;

responsive to receiving the authentication answer from the home subscriber system, generating the bootstrapping transaction identifier at the bootstrapping server function, communicating that bootstrapping transaction identifier to the user equipment, and storing the received service profile and the bootstrapping transaction identifier at the bootstrapping server function.

3. The method according to claim 1, further comprising, responsive to a user subscription or registration request received from the user equipment, determining at the network application function that the requested service requires additional information for enabling the execution of the service for the user equipment, and, responsive to said determination, initiating at the network application function retrieval of this additional information via a bootstrapping secured session by initiating the user subscription or registration, wherein initiating the user subscription or registration comprises transmitting a bootstrapping request to the user equipment.

4. The method according to claim 1, wherein the service is enabled by execution of Generic Bootstrapping Architecture (GBA)-Push.

5. The method according to claim 1, further comprising, responsive to receiving the bootstrapping information request from the network application function, determining, at the bootstrapping server function and from the service profile, if the user equipment is authorized for the requested service, and if so, transmitting a service authorization from the bootstrapping server function to the network application function.

6. The method according to claim 1, further comprising determining the user identity at the bootstrapping server function, if the bootstrapping server function receives a request from the network application function that includes a privacy protected identifier in place of the user identity.

7. The method according to claim 1, wherein the stored service profile is comprised in stored, user-related security settings.

8. The method according to claim 1, further comprising:
applying at the network application function a user's stored service-related information for the initiation of a subsequent bootstrapping push service request for the same user towards the bootstrapping server function or a different bootstrapping server function.

9. The method according to claim 1, wherein the service is enabled by the execution of a bootstrapping push request and wherein the service-related information comprises information indicating at least one of the following:
a user identity for bootstrapping push service requests to a bootstrapping server function;
a user transport identifier for a bootstrapping push service delivery method to the user equipment; and
a bootstrapping server function address for the requested service; and
a UICC application to use for the requested service.

10. The method according to claim 9, wherein the stored service profile further comprises an application identifier.

* * * * *

UNITED STATES PATENT AND TRADEMARK OFFICE
CERTIFICATE OF CORRECTION

PATENT NO.        : 8,750,506 B2
APPLICATION NO.   : 13/056393
DATED             : June 10, 2014
INVENTOR(S)       : Blom et al.

Page 1 of 1

It is certified that error appears in the above-identified patent and that said Letters Patent is hereby corrected as shown below:

On the Title Page, in item (75), under "Inventors", in Column 1, Line 1, delete "Jarfalla" and insert -- Järfälla --, therefor.

In the Specification

In Column 6, Line 21, delete "node;" and insert -- node. --, therefor.

In Column 10, Line 15, delete "comprises" and insert -- comprises: --, therefor.

In Column 14, Lines 31-33, delete "Identities due to.................GBA Push." and insert the same at Line 30 after "Private", as a continuation paragraph.

In Column 15, Line 56, delete "node;" and insert -- node. --, therefor.

Signed and Sealed this
Third Day of March, 2015

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,750,506 B2 | Page 1 of 4 |
| APPLICATION NO. | : 13/056393 | |
| DATED | : June 10, 2014 | |
| INVENTOR(S) | : Rolf Blom et al. | |

It is certified that error appears in the above-identified patent and that said Letters Patent is hereby corrected as shown below:

In the Drawings

Figure 3:
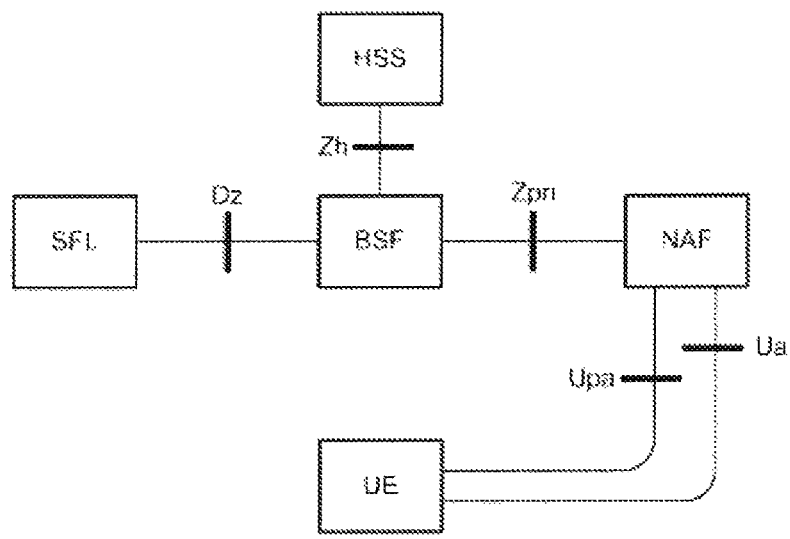
FIG. 3 shows a GBA push reference model.

Figs. 1 and 3, Sheet 1 of 6, replace the drawings with the attached Replacement Sheet.

Figure 2:
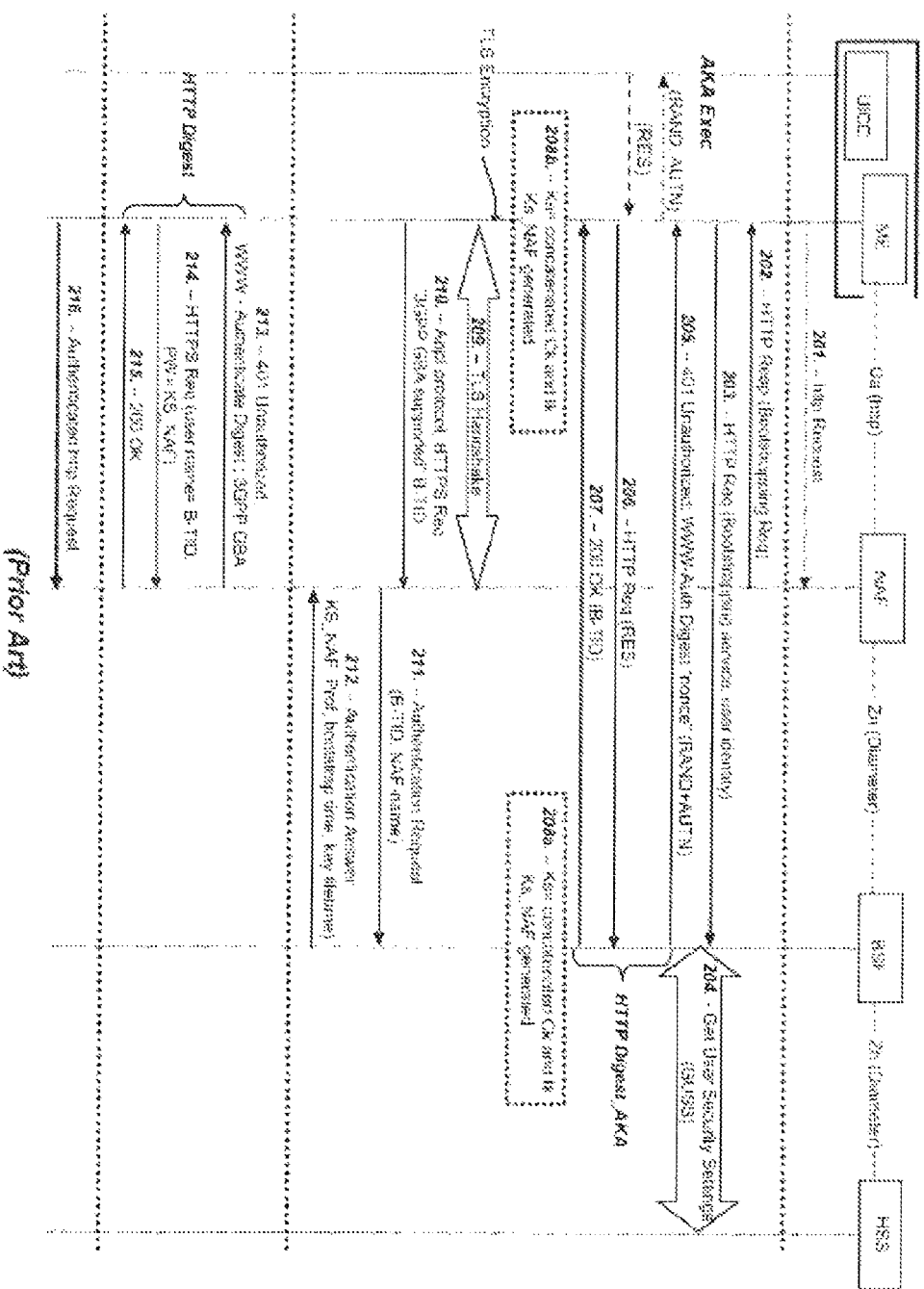
FIG. 2 shows HTTP authentication using GBA.

Fig. 2, Sheet 2 of 6, replace the drawing with the attached Replacement Sheet.

Figure 4:
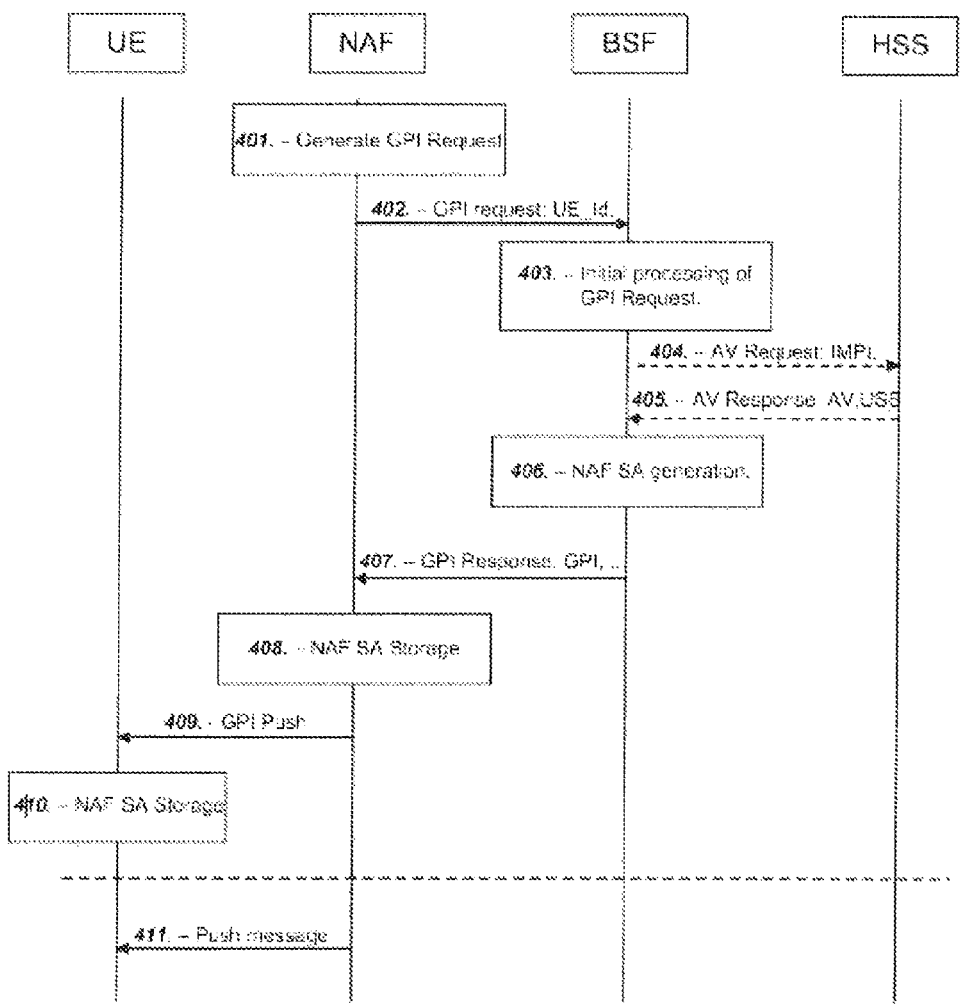
FIG. 4 shows a sequence diagram of GBA push signaling.

Fig. 4, Sheet 3 of 6, replace the drawing with the attached Replacement Sheet.

Signed and Sealed this
Fourth Day of August, 2015

Michelle K. Lee
*Director of the United States Patent and Trademark Office*